United States Patent [19]
Hsu

[11] Patent Number: 5,519,181
[45] Date of Patent: May 21, 1996

[54] APPARATUS FOR GUIDING A WIRE ELECTRODE ON A MACHINE TOOL

[76] Inventor: Wan-I Hsu, No. 20 Shin-I South Road An-Ping Ind., District Tainan, Taiwan

[21] Appl. No.: 271,319

[22] Filed: Jul. 6, 1994

[51] Int. Cl.⁶ .................................................. B23H 7/10
[52] U.S. Cl. ........................................................ 219/69.12
[58] Field of Search ........................ 219/69.11, 69.12, 219/69.14

[56] References Cited

U.S. PATENT DOCUMENTS

| | | | |
|---|---|---|---|
| 3,731,044 | 5/1973 | Ullmann et al. | 219/69.12 |
| 3,830,996 | 8/1974 | Ullmann et al. | 219/69.12 |
| 3,849,624 | 11/1974 | Dulebohn et al. | 219/69.12 |
| 4,431,896 | 2/1984 | Lodetti | 219/69.12 |
| 4,485,288 | 11/1984 | Schneider | 219/69.12 |
| 4,661,678 | 4/1987 | Wavre | 219/69.12 |
| 4,677,270 | 6/1987 | Medici et al. | 219/69.12 |
| 4,751,362 | 6/1988 | Girardin | 219/69.12 |
| 4,945,200 | 7/1990 | Truty et al. | 219/69.12 |

FOREIGN PATENT DOCUMENTS

| | | | |
|---|---|---|---|
| 1-289622 | 11/1989 | Japan | 219/69.12 |
| 6-8055 | 1/1994 | Japan | 219/69.11 |

*Primary Examiner*—Geoffrey S. Evans

[57] ABSTRACT

An apparatus for guiding a wire on a machine tool including two guide heads through which a wire electrode passes. The two guide heads are spaced apart so that a workpiece mounted on a machine table can be placed between the guide heads for the wire electrode to work on. The two guide heads are firmly connected with two guide arms and also pivotally connected with a pivotal arm and an input arm. The two guide heads can be inclined or swung through a large angle.

4 Claims, 5 Drawing Sheets

APPARATUS FOR GUIDING A WIRE ELECTRODE ON A MACHINE TOOL

BACKGROUND OF THE INVENTION

The invention concerns generally an apparatus for guiding a wire electrode on a machine tool, and in particular is an apparatus for controlling the axial tension of the wire electrode in the working zone.

In conventional spark-erosive cutting machines, an upper guide head moves horizontally in the axial direction, and a wire electrode inclines by cooperative movement of the upper and the lower guide head. As the upper and the lower guide head move during the process or eroding cutting there may occur (1) wearing-down of the wire electrode, (2) loosening of the wire electrode, (3) complex forces on the wire electrode, (4) insufficient flow of water, (5) partial change in plastic property of the wire electrode, and finally (6) breaking of the wire electrode. The angle for cutting work is limited to a small angle, 15 degrees at the most. In order to solve this problem, the upper and the lower guide head should incline according to the inclination of the workpiece.

U.S. Pat. No. 4,431,896 uses gimbal suspensions for mounting the guide heads and motors for controlling movement about the respective gimbal axes for accomplishing inclination of the guide heads in accordance with that of the workpiece placed in the working zone.

Another known U.S. Pat. No. 4,485,288 makes use of two parallel sets of four connecting rods, which are moved to orient the upper and the lower guide heads in accordance with the angle of a workpiece.

Another known U.S. Pat. No. 4,667,078 has a wire electrode looped around a grooved wheel controlled by a hysteresis motor near an upper or lower guide head while the wire drive is located near the other guide head so that in the working zone, the electrode is subject to the action of tensile stress necessary for electroerosion. The remaining electrode guide area is kept free from increased tensile stress on the electrode. Additionally, an angle coder is used with the hysteresis motor to measure both the rotational speed and the position of the grooved wheel.

Although the three above mentioned devices for guiding a wire electrode have their own advantages, their structures are generally too complicated to have many control elements, and are difficult to maintain and repair.

SUMMARY OF THE INVENTION

The present invention has been devised to offer an apparatus for guiding a wire electrode on a machine tool. The device allows the upper and the lower guide heads for the wire electrode to incline in accordance with the angle of a workpiece placed between the two guide heads.

The apparatus for guiding a wire electrode on a machine tool according to the present invention comprises two—an upper and a lower—guide heads to guide the wire electrode. Two guide frames are connected to the two guide heads and two cylinders are connected to a connecting rod to move nearer to or farther from each other. The two cylinders are respectively connected to the rear ends of the two guide arms.

An input arm has its front end pivotally connected to a lower portion of the upper guide head and its rear end connected to a rod combined with three motor, and a pivotal arms having its front end connected with the upper portion of the lower guide head and its rear end connected with a bearing fixed on an end of a rod fixed on a machine frame. The input arm is to be moved back and forth by a first of the three motors, and moved up and down by a second of the three motors, and moved to swing by means of the pivotal arms so that the two guide heads can be moved with the guide arms and the two cylinders with the connecting rod;as an integral unit in the U-plane or the V-plane or in a swinging plane and thus incline in accordance with that of the workpiece.

DETAILED DESCRIPTION OF THE INVENTION

Figure 1:
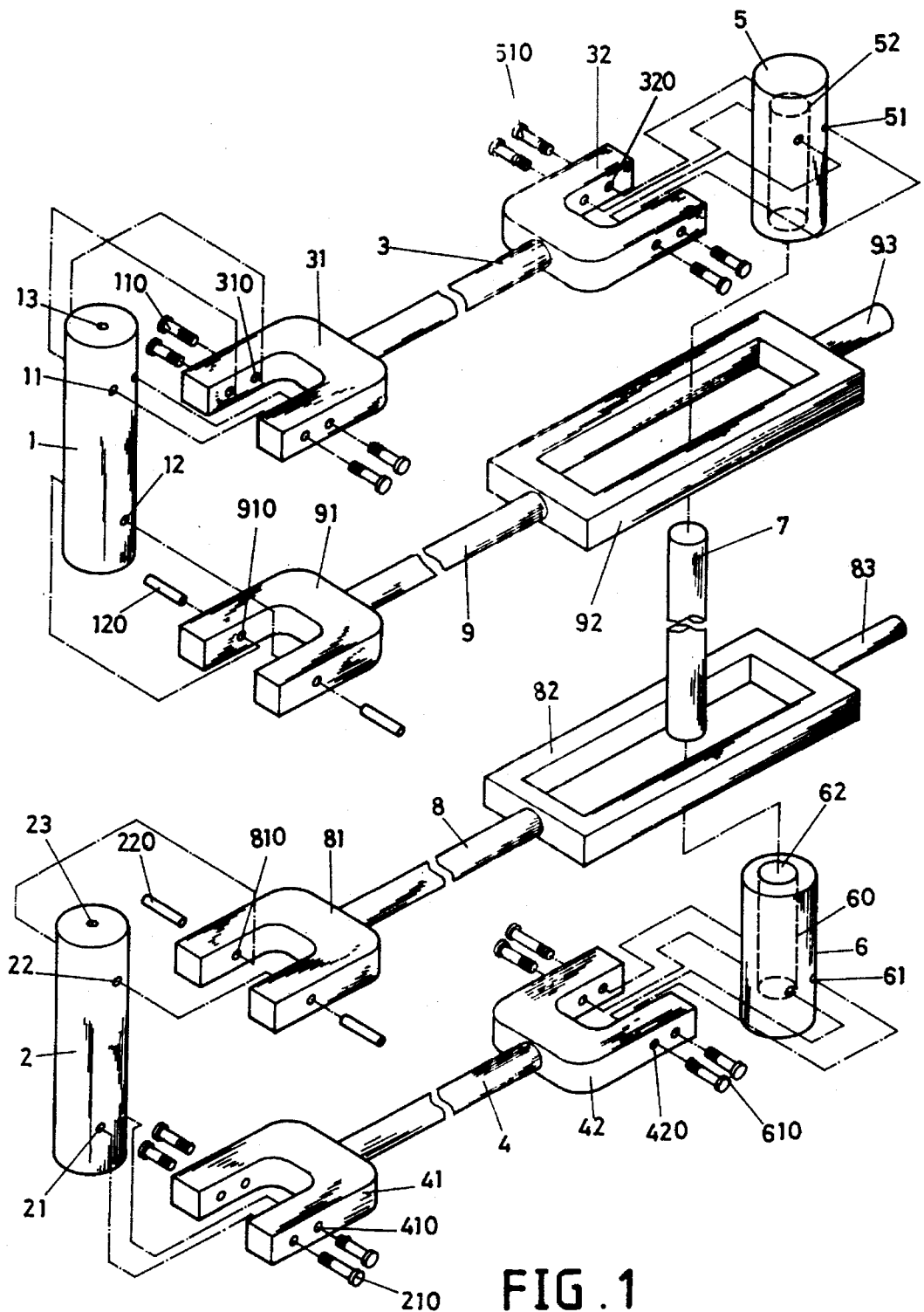
FIG. 1 is an exploded perspective view of an apparatus for guiding a wire on a machine tool in the present invention.
Figure 2:
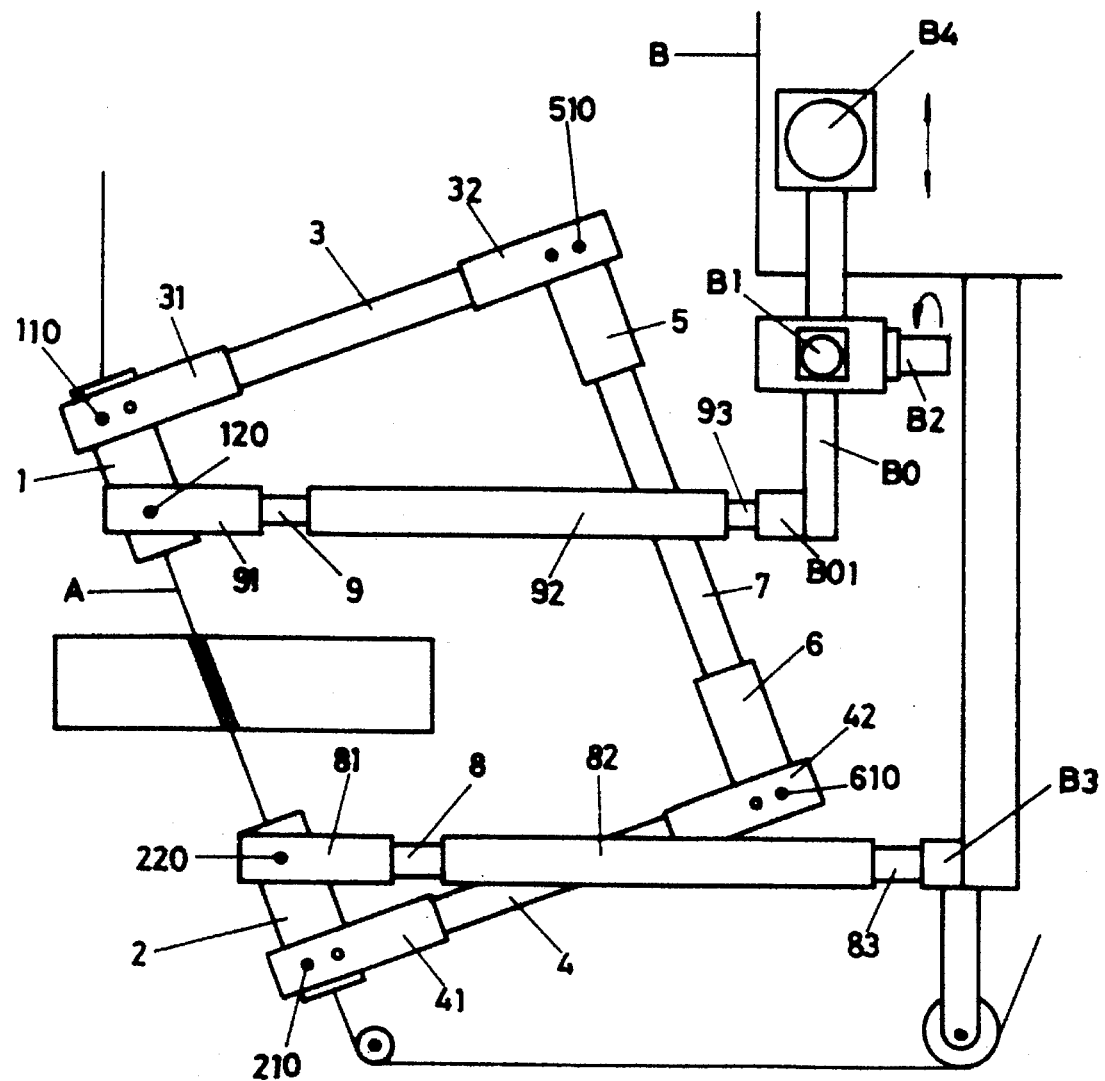
FIG. 2 is a schematic view of the apparatus for guiding a wire on a machine tool connected with a machine frame and a power source in the present invention.
Figure 3:
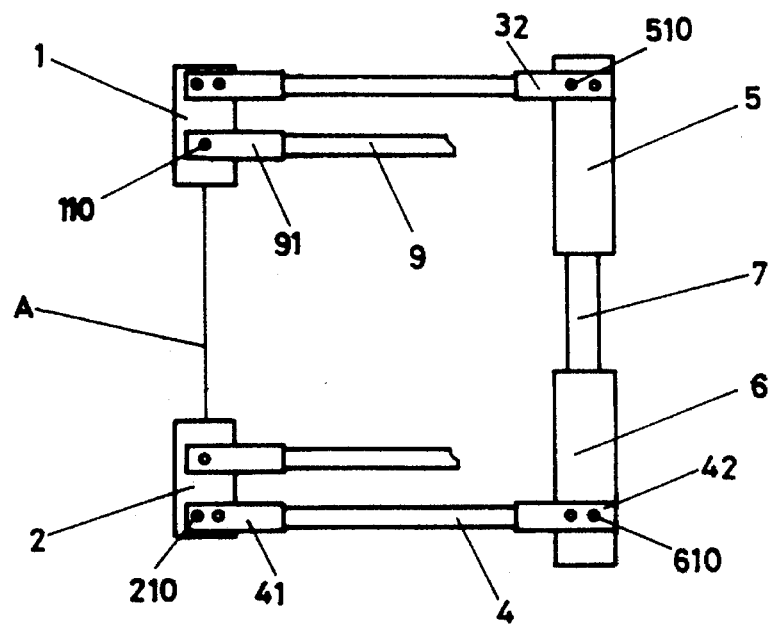
FIG. 3 is a side view of the apparatus for guiding a wire on a machine tool in the present invention.
Figure 4:
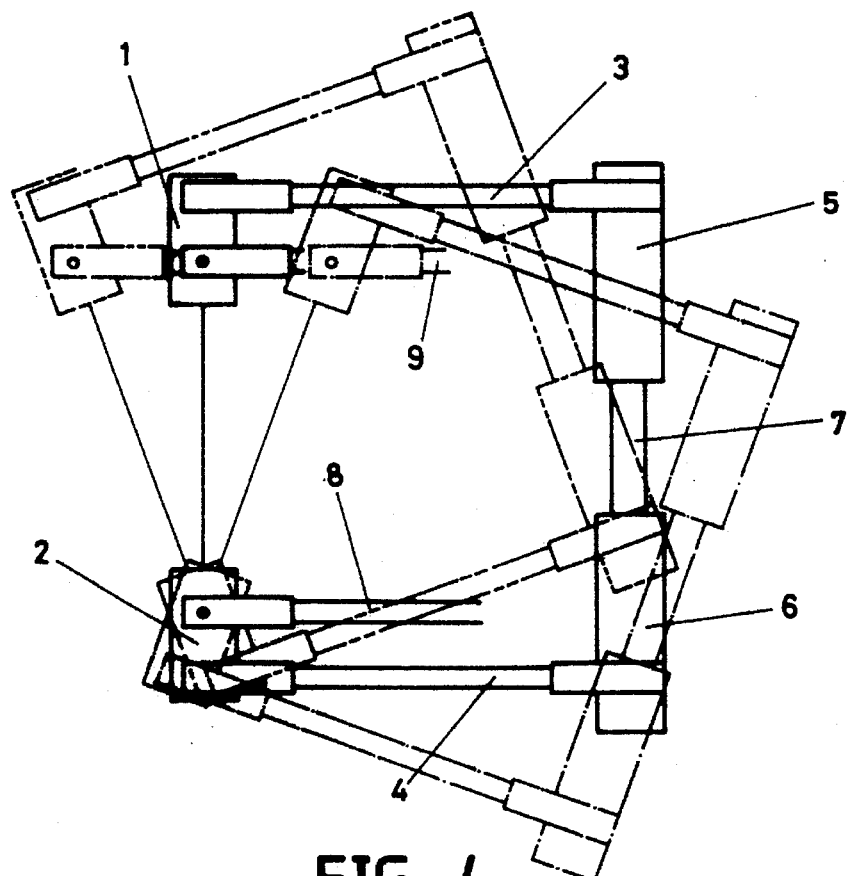
FIG. 4 is a side view of the apparatus for guiding a wire on a machine tool in the present invention.

The present invention is an apparatus for guiding a wire on a machine tool, as shown in FIGS. 1–4. The device comprises an upper guide head 1, a lower guide head 2, an upper guide arm 3, a lower guide arm 4, an upper cylinder 5, a lower cylinder 6, a connecting rod 7, a pivotal arm 8, and an input arm 9 as its main components.

The upper guide head 1 is shaped as a cylinder having a center longitudinal through hole 13 to receive a wire electrode A. Two parallel lateral screw holes 11 are in an upper portion of the guide head 1 to receive screws 110. A pin hole 12 is in a lower portion of the guide head 1 to receive a pin 120.

The lower guide head 2 is shaped the same as the upper guide head 1. It has a center longitudinal through hole 23 to receive the wire electrode A. Through hole 23 is in line with the center longitudinal through hole 13 of the upper guide head 1. Lower guide head 2 also has two parallel lateral screw holes 21 in a lower portion to receive screws 210, and a pin hole 22 in an upper portion to receive a pin 220 to fit therein.

The upper guide arm 3 has two U-shaped blocks 31, 32 joined by an intermediate rod. Both ends of the upper guide arm 3 are connected to the two U-shaped blocks 31, 32. The U-shaped block 31 has two pairs of parallel lateral screw holes 310 in two parallel portions to receive the screws 110. The screw holes 310 align with the two screw holes 11 of the upper guide head 1, thereby securing the upper guide arm 3 to the upper guide head 1. The U-shaped block 32 has two pairs of parallel screw holes 320 in two parallel portions to receive screws 510.

The lower guide arm 4 has two U-shaped blocks 41, 42 joined by an intermediate rod. Both ends of the lower guide arm 4 are connected with the two U-shaped blocks 41, 42. The U-shaped block 41 has two pairs of parallel screw holes 210 to receive the screws 210. The screw holes 210 align with the screw holes 21 of the lower guide head 2, thereby securing the lower guide arm 4 to the lower guide head 2. The U-shaped block 42 has two pairs of parallel lateral screw holes 420 to receive screws 610.

The upper cylinder 5 has two pairs of parallel lateral screw holes 51 to receive the screws 510 after they pass through the screw holes 320 of the U-shaped block 32 of the upper guide head 3. This secures the upper cylinder 5 to the upper guide arm 3. The upper cylinder 5 has a closed upper end and an inner longitudinal hole with an opening in the bottom to receive an upper portion of the connecting rod 7.

The lower cylinder 6 has two pairs of parallel lateral screw holes 61 to receive the screws 610 after they pass through the screw holes 420 of the U-shaped block 42 of the lower guide head 4. This secures the lower cylinder 6 to the lower guide head 2. The lower cylinder 6 has a closed lower end and an inner longitudinal hole 62 with an opening in the top end to receive a lower portion of the connecting rod 7.

The connecting rod 7 has a suitable length so that its upper end fits into the longitudinal hole 52 of the upper Cylinder 5 and its lower end fits into the longitudinal hole 62 of the lower cylinder 6.

The pivotal arm 8 has a front U-shaped block 81, a rear hollow rectangular block 82, and an intermediate rod connecting the front U-shaped block 81 and the rear hollow rectangular block 82. The U-shaped block 81 has a lateral pin hole 810 in each of two parallel portions to receive a pin 220 that also passes through the lateral pin hole 22 of the lower guide head 2 to function as a pivot. A rear rod 83 extends rearward from a rear end of the hollow rectangular block 82, with its distal end received in a bearing B3 which is fixed to the machine frame B, and cannot move in a lateral direction.

The input arm 9 has a similar shape as the pivotal arm 8, with a front U-shaped block 91 at the front, a rear hollow rectangular block 92, and an intermediate rod connecting the U-shaped block 91 and the rectangular block 92. A rear rod 93 extends rearward from the rear end of the rectangular block 92. The U-shaped block 91 has a pin hole in each of two parallel portions to receive two pins 210 that also pass through the two pin holes 12 of the upper guide head 1 to swing relative to the input arm 9. The rear rod 93 has its distal end fixed in a bearing B01 fixed on a guide threaded rod B0 connected with two motors, a first motor B1 and a second motor B2.

After all the components of the apparatus for guiding a wire on a machine tool described above have been assembled as described, the input arm 9 is connected to the baring B01 of the guide threaded rod B0 that is connected to the first and the second motors B1, B2. The pivotal arm 8 is to connected to the bearing B3 fixed to the machine frame B.

Operation of the apparatus for guiding a wire on a machine tool is as follows: The upper guide head 1, the upper guide: arm 3, and the upper cylinder 5 are firmly connected to one another to move together as an integral unit. The lower guide head 2, the lower guide arm 4, and the lower cylinder 6 are firmly connected to one another to move together as an integral unit. The input arm 9 moves back and forth by means of the first motor B1, causing the upper guide head 1 to also move back and forth. The upper guide head 1 and the lower guide head 2 can be moved correspondingly and simultaneously to swing laterally by means of the pivotal pin 220 as a pivotal shaft. The input frame 9 can also move by operation of the second motor B2, thus changing the upper and lower guide head 1 and 2 from vertical (1) with the stationary frame 8 functioning as a pivotal shaft in the bearing B3. The connecting rod 7 has its ends fitting in the upper cylinder 5 and the lower cylinder 6. When the distance between the upper and lower guide head 1 and 2 has to be adjusted, a third motor B4, fixed on the machine frame, is used to move up and down the threaded guide rod B0. This moves the input arm 9, the upper guide head 1, the upper arm 3, and the upper cylinder 5, up and down. Since the connecting rod 7 slides within the upper and lower cylinders 5 and 6, the distance between the upper and lower guide heads 1 and 2 varies according to the requirements of the workpiece. Thus the angle of the upper and the lower guide head 1 and 2 is kept the same as that of the workpiece so that the tension of the wire electrode through the center through holes 13 and 23 of the upper and lower guide head 1 and 2 can be maintained properly and stably. Therefore, breakage and wear can be prevented, and the eroding function can be improved.

Figure 5:
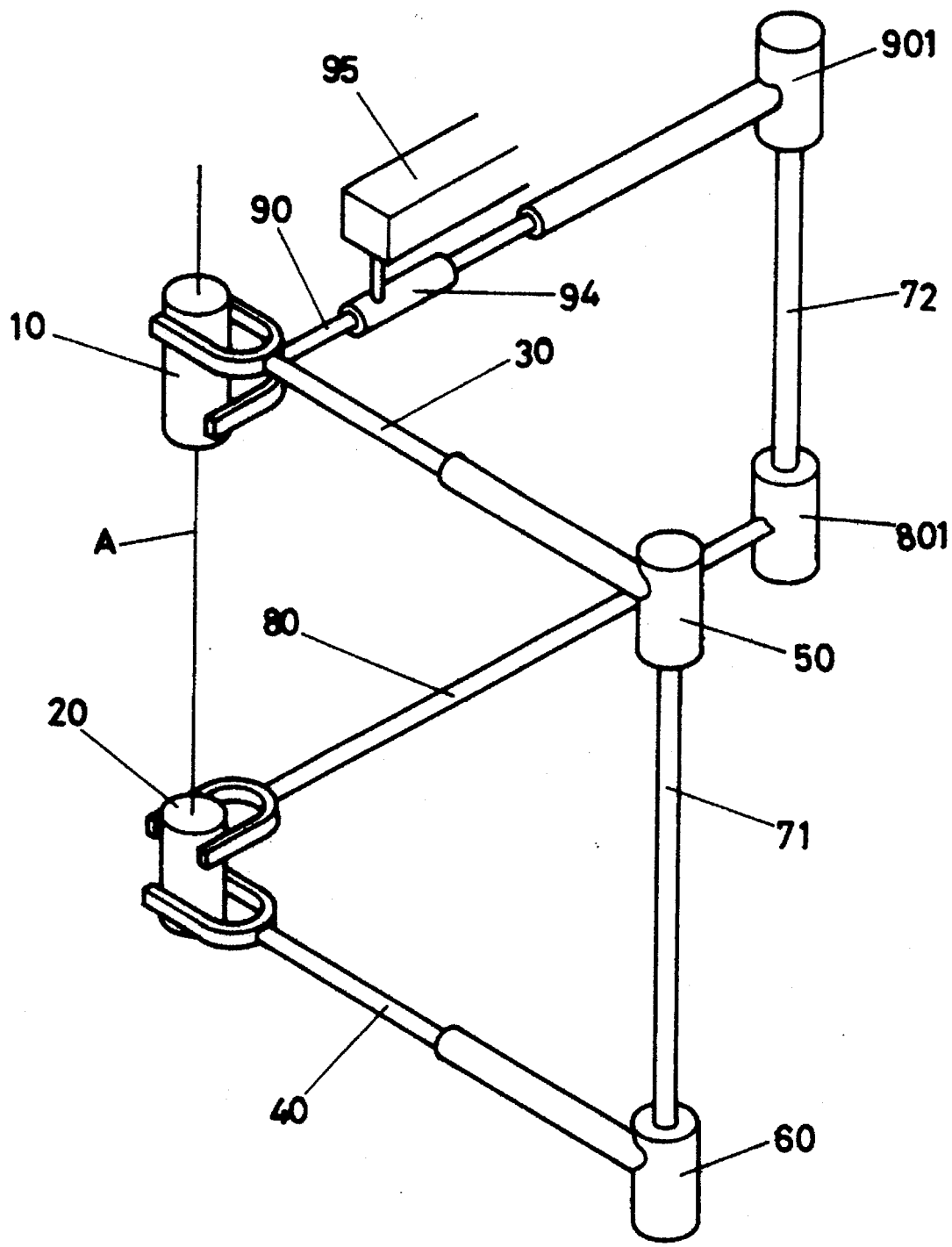
FIG. 5 is a perspective view of a second embodiment of the apparatus for guiding a wire on a machine tool in the present invention.
Figure 6:
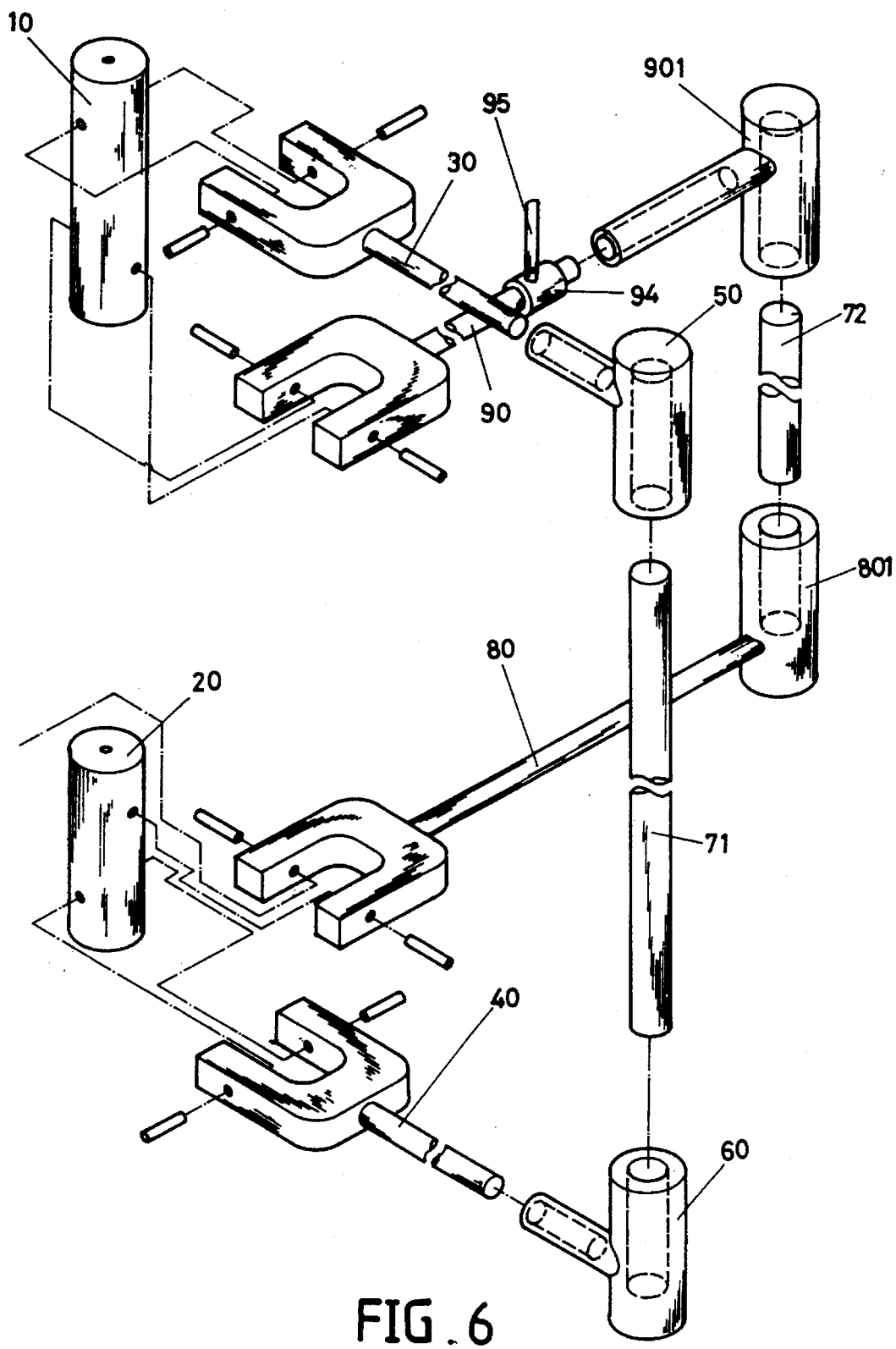
FIG. 6 is an exploded perspective view of the second embodiment of the apparatus for guiding a wire on a machine tool in the present invention.

A second embodiment of the present invention is shown in FIGS. 5 and 6. The device comprises an upper guide head 10, a lower guide head 20, an upper guide arm 30, a lower guide arm 40, a first L-shaped upper cylinder 50, a first L-shaped lower cylinder 60, two, a first and a second, connecting rods 71 and 72, a pivotal arm 80, an input arm 90, a second L-shaped upper cylinder 901, and a second L-shaped lower cylinder 801.

The upper guide head 10 has its upper portion pivotally connected to a U-shaped portion of the upper guide arm 30 and a lower portion pivotally connected to a U-shaped portion of the input arm 90.

The lower guide head 20 has its upper portion pivotally connected to a U-shaped portion of the pivotal arm 80 and a lower portion pivotally connected to a U-shaped portion of the lower guide arm 40.

The upper guide arm 30 has a U-shaped portion pivotally connected with the upper guide head 10, and a connecting rod connecting the U-shaped portion with the first L-shaped upper cylinder 50.

The lower guide arm 40 has a U-shaped portion pivotally connected with the lower guide head 20, and a connecting rod connecting the U-shaped portion with the first L-shaped lower cylinder 60.

The upper L-shaped cylinder 50 has a lateral tubular portion to receive an end portion of the connecting rod of the upper guide arm 30 and an inner longitudinal hole to receive the upper portion of the connecting rod 71.

The first lower L-shaped cylinder 60 has a lateral tubular portion to receive an end portion of the connecting rod of the lower guide arm 40 and an inner longitudinal hole to receive the lower portion of the connecting rod 71.

The connecting rod 71 has its upper end portion fitted into the inner longitudinal hole of the first upper L-shaped cylinder 50 and its lower end portion fitted into the inner longitudinal hole of the first lower L-shaped cylinder 60.

The connecting rod 72 has its upper end portion fitted into the inner longitudinal hole of the second L-shaped upper cylinder 901 and its lower end portion fitted into an inner longitudinal hole of the second lower L-shaped cylinder 801.

The pivotal arm 80 has a U-shaped portion pivotally connected with the lower guide head 20, and a connecting rod connecting the U-shaped portion to the second lower cylinder 801.

The input arm 90 has a U-shaped portion pivotally connected with the upper guide head 10 and a connecting rod extending from the U-shaped portion. A sleeve 94 is fixed on an intermediate portion of the connecting rod. A rod 95 extends from the sleeve 94 to connect with a first motor B1 for moving the input arm 90 horizontally, and with a second motor B2 for swinging the input arm 90. The connecting rod fits in a tubular lateral portion of the L-shaped cylinder 901.

After the second embodiment of the present apparatus is constructed and connected to the motors B1, B2 and with the wire supplying device, the rear upper cylinder 901 and the second lower cylinder 801 with the connecting rod 71 to not move with the input arm 90 even when the input arm 90 moves laterally. When the input arm moves laterally, the upper and the lower guide head 10, 20 incline, with the pin combining the lower head 20 and the pivotal arm 80 acting as a pivot. The guide heads 10, 20 are connection to the upper and the lower guide arms 30 and 40, and the first upper and the first lower cylinders 50 and 60, and the connecting rod 71. When the input arm 90 moves in the longitudinal direction, the whole structure of the apparatus swings longitudinally with the pivotal arm 80 as a shaft, forcing the upper and the lower guide heads 10 and 20 to incline correspondingly. As to the change of the distance between both the heads 10 and 20, it can be effected by an up or down movement of the first upper and the first lower cylinder 50 and 60 relative to the connecting rod 71, and by an up and down movement of the second upper and the second lower cylinder 901 and 801 relative to the connecting rod 72.

I claim:

1. An apparatus for guiding a wire on a machine tool comprising:

a cylindrical upper guide head having a central longitudinal through hole to receive a wire electrode, two lateral parallel screw holes in an upper portion, and a pin hole in a lower portion;

a cylindrical lower guide head having a center longitudinal through hole to receive a wire electrode, two lateral parallel screw holes in a lower portion, and a pin hole in an upper portion;

an upper guide arm having a front U-shaped block and a rear U-shaped block connected to each other by an intermediate rod, the front U-shaped block having two parallel screw holes in two parallel portions for screws to secure the front U-shaped block with the upper portion of said upper guide head;

a lower guide arm having a front U-shaped block and a rear U-shaped block connected to each other by an intermediate rod, the front U-shaped block having two parallel screw holes in two parallel portions for screws to secure the front U-shaped block with the lower portion of said lower guide head;

an upper cylinder having a closed upper end, a longitudinal hole, and two parallel screw holes to receive screws to secure the upper cylinder to the rear U-shaped block of said upper guide arm;

a lower cylinder having a closed lower end, a longitudinal hole, and two parallel screw holes to receive screws to secure the lower cylinder to the rear U-shaped block of said lower guide arm;

a connecting rod having a diameter smaller than the longitudinal holes of said upper and said lower cylinders so that said connecting rod fits into said two longitudinal holes to allow said upper and said lower cylinders to move up and down along the connecting rod so that the space between said upper and said lower cylinder is varied;

a pivotal arm having a front U-shaped block bored with a lateral pin hole in each of two parallel portions to receive a pin to pivotally connect the front U-shaped block with said upper portion of said lower guide head, a rear hollow rectangular block for said connecting rod to pass through, an intermediate rod connecting the front U-shaped block and the rear hollow rectangular block, and a rear rod extending from a rear end of the rectangular block to fit rotatably in a bearing attached to a machine frame;

an input arm having a front U-shaped block bored with a lateral pin hole in each of two parallel portions to receive a pin to pivotally connect the front U-shaped block with said upper guide head, a rear hollow rectangular block, an intermediate rod connecting the front U-shaped block with the rear hollow rectangular block, and a rear rod extending from a rear end of the rectangular block fit rotatably in a bearing attached on a threaded rod connected with a first, a second, and a third motor mounted on a machine frame; and wherein said input arm is movable back and forth by said first motor, said pivotal arm being able to rotate around said pin combining said lower guide head and said pivotal arm, said upper and said lower guide heads also move laterally, said input arm swings longitudinally via the pivotal arm functioning as a pivotal shaft and forcing said upper and said lower guide heads to incline longitudinally, said connecting rod allowing said upper and said lower cylinder to move up and down when said upper and said lower guide head move nearer to or farther from each other, and thereby said upper and said lower guide heads incline at the same time in accordance with the inclination of the wire electrode so as to secure tension of the wire electrode, to prevent wear of said wire electrode, to lower the rate of breaking of the wire electrode, to increase an eroding angle, and to reinforce jetted water flow into a working zone.

2. The apparatus for guiding a wire on a machine tool as claimed in claim 1, wherein:

said upper and said lower guide arms are respectively secured to said upper and said lower guide heads, thereby always moving together.

3. The apparatus for guiding a wire on a machine tool as claimed in claim 1 wherein:

said upper and said lower guide arms are respectively secured to said upper and lower cylinders, thereby always moving together.

4. The apparatus for guiding a wire on a machine tool as claimed in claim 1, wherein;

the upper portion of said upper guide head is pivotally connected with said upper guide arm, the lower portion of said lower guide head pivotally connected with said lower guide arm, said upper and said lower guide arms respectively being fixed to a first upper and a first lower L-shaped cylinder, a connecting rod having its upper end portion fitting in a longitudinal hole of said first upper cylinder and its lower end portion fitting in a longitudinal hole of said first lower L-shaped cylinder, said upper and said lower guide arms and said first upper and said first lower cylinder functioning as an integrated unit to swing laterally, said lower portion of said upper guide head is pivotally connected to said input arm, said upper portion of said lower guide head is pivotally connected to said pivotal arm, said input arm having its intermediate portion provided with a sleeve connected through a L-shaped rod to a first and a second motor mounted on a machine frame, said input arm having its rear end connected to a second upper L-shaped cylinder, said pivotal arm having a rear end fixed secured to a second lower L-shaped cylinder, said second upper and said second lower cylinders connected by a connecting rod between them and moving nearer to or farther from each other, said second upper and said second lower cylinder, said second connecting rod between both the second cylinders, and said pivotal arm being stationary when said input arm moves laterally, said upper and said lower guide arm, said first upper and said first lower L-shaped cylinders and said first connecting rod together guiding said upper and said lower guide heads to swing with a pivotal arm as a shaft when said input arm swings longitudinally, said input arm swinging longitudinally with said pivotal arm as a shaft, and said first and said second upper L-shaped cylinders moving nearer to or farther from each other in accordance with the movement of said upper and said lower guide heads.

* * * * *